United States Patent

[11] 3,600,062

| [72] | Inventors | Eugene R. Schineller<br>Huntington Station, N.Y.;<br>Donald W. Wilmot, Nashua, N.H. |
|---|---|---|
| [21] | Appl. No. | 616,034 |
| [22] | Filed | Feb. 14, 1967 |
| [45] | Patented | Aug. 17, 1971 |
| [73] | Assignee | Hazeltine Research, Inc. |

[54] WIDE ANGLE NARROW BAND OPTICAL FILTER
8 Claims, 8 Drawing Figs.

[52] U.S. Cl. ...................................... 350/166,
350/96 WG
[51] Int. Cl. ............................................ G02b 5/28
[50] Field of Search ........................................ 350/163-
—166, 96 WG

[56] References Cited
UNITED STATES PATENTS
| 3,414,837 | 12/1968 | Snitzer | 350/96 X |
| 3,372,969 | 3/1968 | Snitzer | 350/96 WG |
| 3,395,366 | 7/1968 | Snitzer et al. | 350/96 (WG) |
| 3,308,394 | 3/1967 | Snitzer et al. | 331/94.5 |

OTHER REFERENCES

" Optical Waveguides," Wireless World, Vol. 72, No. 4. April 1966. Found in 350/96(WG)

Snitzer, " Proposed Fiber Cavities For Optical Masers" Journal of Applied Physics, Vol. 32 (1961) pages 36 to 39

*Primary Examiner*—David Schonberg
*Assistant Examiner*—T. H. Kusmer
*Attorney*—Kenneth P. Robinson ABSTRACT: An optical filter including a plurality of waveguides which are either designed to operate only in a single mode or have their transmission limited to a single mode by an external means. Semitransparent mirrors are placed within, or at the ends of each waveguide to provide interference type filtering in each waveguide. Since the propagation characteristics of each waveguide are independent of the angle of the incident wave, the filter provides narrow band transmission of an incident plane wave or image over a wide field of view.

PATENTED AUG 17 1971                                              3,600,062

WIDE ANGLE NARROW BAND OPTICAL FILTER

BACKGROUND OF THE INVENTION

This invention is directed to apparatus useful in optical systems and more particularly, to an optical filter. There are several types of optical filters known in the art. For example, absorption type filters, such as colored glass, are used in many optical systems. They have a wide field of view, but also, inherently, have a wide bandwidth. The need for optical filters with a narrow frequency band has greatly increased with the advent of the laser. The small bandwidth of the laser permits the use of narrow band filters to greatly improve signal-to-noise ratio. However, it is often desirable to operate a narrow band system over a wide field of view. Wide field of view is desirable, for instance, in radar and communication systems whenever the position of the target or transmitter is not accurately known and it is an essential requirement in any imaging system.

Interference type filters such as the Fabry-Perot or multilayer interference type are capable of providing narrow band filtering. However, prior art interference type filters are limited in performance by the mutual dependence of the frequency and angle characteristics. The center frequency and bandwidth of such filters vary as the angle of incident radiation is varied. Consequently, a filter designed for a narrow frequency band is restricted to operate over a narrow field of view as well. Operation at angles outside this narrow field of view results in high attenuation to the desired signal and permits reception of undesired signals outside the desired passband.

SUMMARY OF THE INVENTION H

It is therefore an object of the present invention to provide a new and useful filter which achieves narrow bandwidth transmission of an optical image. It is a further object of the present invention to provide a narrow band optical filter in which the frequency response is independent of the angle of incidence of the optical wave. It is a further object of the present invention to provide a wide angle optical filter having a small bandwidth.

In accordance with the present invention there is provided a wide angle optical filter for transmitting only desired portions of the frequency spectrum of an incident optical wave comprising a plurality of laterally spaced optical waveguide means for providing single mode transmission of an incident wave and a plurality of semitransparent reflecting means positioned along and substantially transverse to the longitudinal axis of each of the waveguide means for providing a filtering effect in each of the waveguide means for limiting the transmission of the incident wave in each of the waveguides to the desired portion of the frequency spectrum. The frequency response of the filter is independent of the angle of the incident wave thereby providing an optical filter capable of providing narrow band transmission of an image over a wide field of view.

DESCRIPTION OF THE INVENTION

Figure 1A:
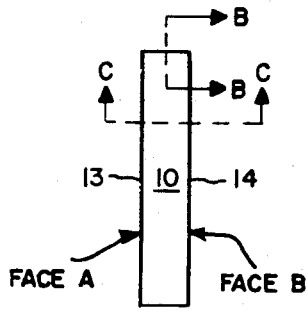
FIG. 1a is a side view of an optical filter constructed in accordance with the present invention.
Figure 1B:
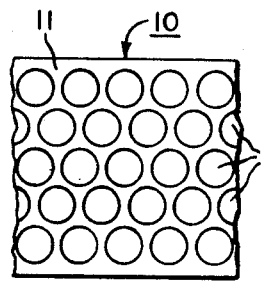
FIG. 1b is a magnified sectional view taken along line BB.
Figure 1C:
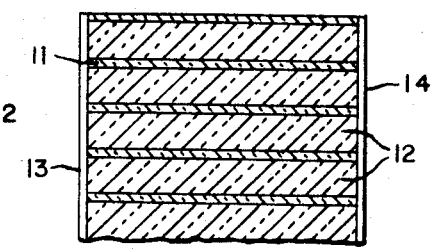
FIG. 1c is a magnified sectional view taken along line CC.

FIG. 1 illustrates an optical filter for transmitting only a desired portion of the frequency spectrum of an incident wave constructed in accordance with the present invention. The filter comprises a plurality of laterally spaced optical waveguide means 10 for providing single mode transmission of the incident wave. As shown in FIGS. 1b and 1c, means 10 consists of a block of first dielectric material 11 and a plurality of cylindrical dielectric cores 12 located within the block 11. The refractive index, $n_1$, of the cores 12 is higher than the refractive index, $n_2$, of the dielectric block 11 in which they are imbedded. The cross-sectional shape of the fibers is arbitrary, the circular cross section shown being one example. The cores 12 are many times smaller than illustrated, typically being less than 20 microns. The views 1b and 1c have been magnified to illustrate the relationship of the cores 12 to the dielectric block 11.

Figure 6:
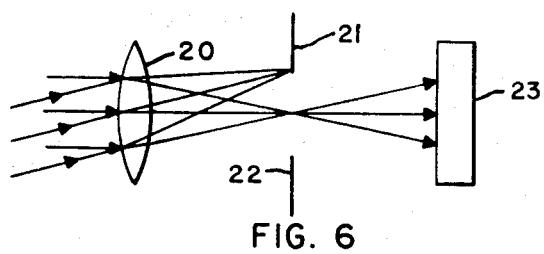
FIG. 6 is an illustration of the use of a field stop to limit mode propagation in a multimode array.

As is explained more fully below, dielectric block 11 and dielectric cores 12 comprise a plurality of optical waveguides. It is essential to the present invention that the optical energy propagated in these waveguides be propagated substantially in a single mode. Single mode propagation may be achieved either by designing the individual waveguides so that they are only capable of propagating the dominant mode or by restricting the excitation of the waveguides, as is illustrated in FIG. 6, so that they are only excited in a single mode.

The filter also includes a plurality of semitransparent reflecting means, semitransparent mirrors 13 and 14, positioned along and transverse to the axis of each of said waveguides. The mirrors 13 and 14 provide interference type filtering in each of the waveguides which limits the transmission of an incident wave in each of the waveguides to the desired portion of the frequency spectrum. Since the frequency response of the filter is independent of the angle of the incident wave the filter is capable of providing narrow band transmission of an image over a wide field of view. The image may be represented as a series of plane wave incident at angles within the field of view or a single plane wave representing a distant point source.

Figure 2:
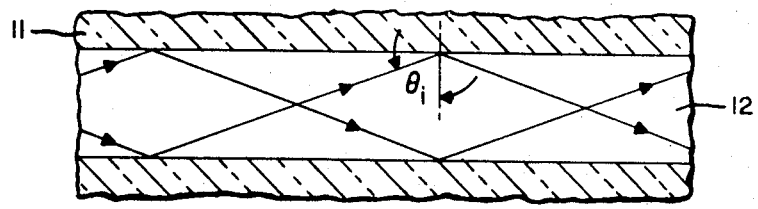
FIG. 2 is a longitudinal cross-sectional view of an optical dielectric waveguide.

The waveguide array of FIG. 1 is similar to a conventional fiber optic faceplate with the significant difference that in the present invention the individual waveguides are limited to propagating the transmitted wave in only the dominant mode. In a circular dielectric waveguide as illustrated in FIG. 2 and FIGS. 1b and 1c, the dominant mode is referred to as $HE_{11}$. In a conventional fiber optic faceplate there generally has been no intent or attempt to control or select the number of propagating modes within the "light pipes" and they most commonly have been highly multimode. However, it is possible to design a "light pipe" so that it exhibits waveguide characteristics, namely it propagates energy in a single mode or a limited number of low order modes. The design of single mode optical waveguides is fully explained in the copending application Ser. No. 318,970 of Robert A. Kaplan, filed Oct. 25, 1963, now U. S. Pat. No. 3,386,787 and will be summarized below. For the case where multimode waveguides are utilized propagation can be restricted to a single mode by selective excitation of the waveguides by restricting the range of incident angles such as by conventional field stops.

It is necessary to use a plurality of waveguides in the present invention, such as illustrated in FIGS. 1a, 1b, and 1c, in order to provide a large collecting area and in order to transmit an image. A single optical waveguide cannot transmit an image. Regardless of the intensity and phase (or angle) distribution of the input signal, the output of a single "light pipe" or waveguide, propagating only the dominate mode, is always an on-axis beam with a spatial distribution determined entirely by the waveguide. Fortunately this restriction may be easily avoided by arraying a large number of waveguides in a configuration such as illustrated in FIG. 1b. An array of this type has very different image properties from a single waveguide. If the optical lengths of the individual fibers are equal, within some tolerance, light will leave the array in precisely the same angle in which it arrived. Therefore such a device can be placed in an imaging system without seriously affecting the image quality.

The narrow band wide field of view characteristics of the present filter are achieved by fabricating some sort of a filtering capability within each of these waveguides. Since the waveguides are propagating only in a single mode, propagation characteristics within each waveguide are independent of the angle of incident radiation. Therefore the frequency characteristics of the filter are independent of the angle of incidence. The field of view of the filter is equal to the beam width of the individual waveguides which in turn is determined by their cross-sectional size. In FIG. 1 filtering is achieved by providing mirrors 13 and 14 on the opposite faces of the waveguide array, thereby forming a Fabry-Perot type of etalon with the waveguide array as the propagation medium. Mirrors 13 and 14 may be placed adjacent to the surfaces of dielectric block 11 by any convenient method. However, vacuum deposition would appear to be the most feasible.

Figure 3:
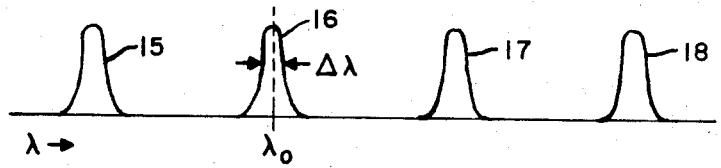
FIG. 3 is a typical spectral response of a Fabry-Perot type filter for a fixed angle of incidence.

A wide band optical signal incident on face A of the filter of FIG. 1 will emerge from face B in a spectral pattern as illustrated in FIG. 3. FIG. 3 is the well-known Fabry-Perot "comb" spectral pattern and contains the desired portion of the frequency spectrum. Each of the frequency or wavelength segments 15, 16, 17, and 18 of FIG. 3 is a very narrow portion of the optical band. It is well known in the art how to design a Fabry-Perot type filter to obtain a spectral pattern as illustrated in FIG. 3 which contains the desired narrow band segment and then by other known techniques such as wide band interference or absorption filtering to produce an overall filter which has a spectral response of just one of the narrow band segments 15, 16, 17, or 18. It should therefore be understood that the filter of FIG. 1 might be a component of a larger filtering system but that it is the filter of FIG. 1 which makes possible narrow band filtering over a wide field of view. It is also possible to eliminate the undesired frequency bands by adding additional filtering sections tuned to the center frequency but with slightly different separation between frequency bands. The technique used will depend on the particular application.

As mentioned above, the waveguides 10 must transmit the incident energy in substantially a single mode. Single mode operation can be achieved by designing the waveguides so that they only propagate the dominant mode. For a better understanding of mode propagation consider the optical waveguide of FIG. 2. Within a waveguide of this type the propagating fields can be resolved into plane wave components experiencing total reflection at the dielectric boundaries. The angle of propagation of the rays, $\theta_t$, is determined entirely by the waveguide properties. For a dielectric waveguide, the parameters controlling the propagation angle are the cross-sectional dimensions of the core 12 and the indices of refraction of the core 12 and cladding 11. The angle of propagation of the plane wave components within the fiber for any mode is completely independent of the angle of incidence at the input. Therefore, fabrication of the resonator in a single mode medium means that only one angle is allowed and therefore achieves the useful result that the frequency characteristics of the resultant waveguide filter are independent of the angle of incidence, thereby making possible the construction of a filter having a narrow bandwidth over a wide field of view.

A dielectric waveguide such as illustrated in FIG. 2 consisting of a glass core 12 surrounded by a glass cladding 11 of lower refractive index is in general capable of supporting many propagating modes. However, it is possible to construct a dielectric waveguide in which propagation is limited to a single mode by choosing the critical angle of the dielectric interface so that only waves in the lowest order mode experience total internal reflection. All other modes propagate at angles less than the critical angle and are highly attenuated. Having selected the dielectric material for the core 12 and the cladding 11 the condition for single mode operation of a circular waveguide is given by equation 1:

$$\frac{d}{\lambda}\sqrt{n_1^2 - n_2^2} \leq \frac{2.4}{\pi} \quad (1)$$

wherein $d$ is the fiber diameter, $\lambda$ is the free space wavelength and $n_1$ and $n_2$ represent the refractive index of the core and cladding respectively. Solving equation 1 for the diameter yields equation 2:

$$d \leq \frac{2.4\lambda}{\pi\sqrt{n_1^2 - n_2^2}} \quad (2)$$

It is obvious from this equation that $n_1$ must be greater than $n_2$.

As stated above, it is also possible to achieve single mode operation by utilizing multimode waveguides, which are well known in the art, and limiting the excitations of the waveguides to the dominant mode. The various modes in a waveguide have different radiation patterns, i.e., energy radiates into prescribed directions in space. Conversely, these waveguide modes are excited efficiently only if energy is incident from these same directions. The radiation pattern of the dominant mode in a multimode waveguide is an on-axis beam having a width in radians approximately equal to $\lambda 1d$. All higher order modes have radiation patterns such that most of the energy is radiated at angles equal to, or greater than $\lambda 1d$. Consequently, if the field of view of the filter is restricted to angles equal to, or less than $\lambda 1d$, all higher order modes will be excited with a very low intensity relative to the dominant mode. The field of view of this filter can be limited by well-known techniques such as a convention field stop illustrated in FIG. 6. Only energy within a prescribed field of view will be so focused by lens 20 that it will pass through the opening between the plates 21 and 22 and be incident on the filter 23. Rays having an angle outside this desired field of view are prevented from being incident on filter 23 by the plates 21 and 22.

Utilizing either single mode waveguides or single mode transmission by selective excitation of multimode waveguides permits the filter to have a relatively wide field of view. The propagation characteristics of each waveguide are independent of the incidence angle of the wave to be filtered. The spectral response is substantially the same whether the incident wave is normal to the axis of the waveguides or some large angle off normal. However, the amount of energy at each spectral line 15, 16, 17, and 18 which is transmitted by the filter is effected by the angle of incidence and this is the primary limitation on the field of view. It should be noted that this limitation on the field of view is completely independent of the frequency characteristics and that the field of view based on this limitation is much larger than that imposed by the frequency shift encountered with prior art interference type filters.

As noted above the present filter must have a plurality of waveguides in order to transmit an image and in order to provide a large enough collecting aperture. Having selected the diameter of the individual cores to provide the desired field of view the next consideration is the spacing of these cores. The cores must be as tightly packed as possible in order to reduce the transmission loss of the array since light incident between the cores is effectively lost. The core spacing must also be small to minimize the radiation of the output power into grating lobes. While on the other hand, the cores cannot be placed arbitrarily close because power then begins to couple transversely from core to core thereby reducing image resolution.

Individual glass waveguides may be combined in a number of configurations. The hexagonal array shown in FIG. 1b is a common example of the conventional fiber optic bundle. Spacing between cores must be determined by trade-offs among the three factors listed above. The most critical of these is transmission loss.

Figure 4:
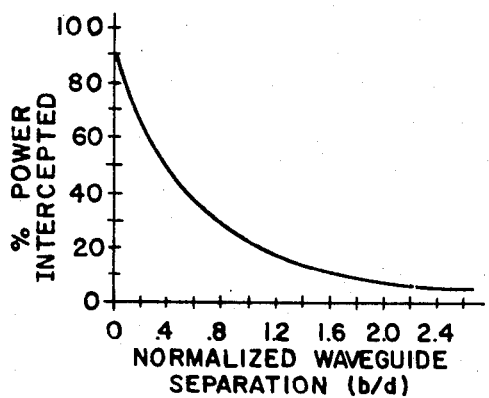
FIG. 4 is a graphical illustration of the relationship between the core spacing and the incident energy that is intercepted by the waveguides.
Figure 5:
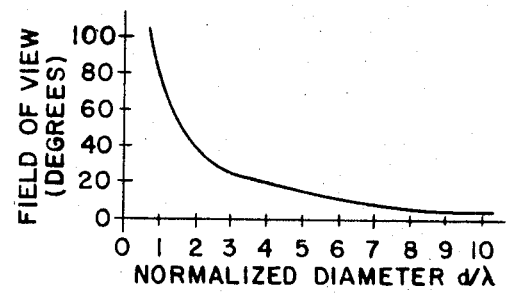
FIG. 5 is a graph of the field of view of the waveguides versus the waveguide size in wavelengths.

The array shown in FIG. 1b may be considered as consisting of adjacent cells of equal area each containing a circular waveguide. The approximate fraction of incident power intercepted by each waveguide is given by equation 3:

$$\frac{P_{\text{waveguide}}}{P_{\text{total}}} = 0.9 \frac{d^2}{(b+d)^2} \quad (3)$$

wherein $b$ is the core separation. This relationship, as shown in FIG. 4, indicates that the power intercepted increases rapidly as the spacing decreases.

An additional consideration in the array design is dissipation of the energy which is incident between the cores 12. Actually much of this energy may not be passed by the resonator since the resonate frequency for light between the cores 12 will be somewhat different from the resonate frequency of the waveguides. However, whatever light is present may degrade both image and frequency characteristics. If this light is significant it may be prevented by placing an absorbing material between the fibers being careful not to attenuate desired energy propagating in the waveguides. This technique is used in conventional fiber optics and is referred to as Extramural Absorber. The Extramural Absorber is also desirable in the FIG. 1 filter to dissipate the energy which is incident on the waveguides but which is not coupled into the dominant mode.

The two-dimensional array of waveguides will in general produce a number of grating lobes. In the present application any such grating lobes caused by the array structure will divert power from the main image into auxiliary images. Grating lobes can be absolutely eliminated if core spacing is restricted to values less than $\lambda/2$. When this $\lambda/2$ criteria is not met there are always grating lobes. However, the power radiated into these lobes can be reduced by increasing the effective area of the waveguide relative to the area of the array cell. In other words, the more completely the cell is filled, less is the power radiated into grating lobes. Therefore, minimum core spacing is also useful towards reducing the grating lobes. It will also be possible to prevent the occurrence of multi-images due to grating lobes by certain design techniques such as randomizing core spacings.

The desire to provide minimum spacing between the waveguides is limited by coupling between the guides. In addition to the fields existing within the cores 12, there are evanescent fields extending into the cladding 11. The effect of these fields is to couple light between the individual cores in the array. In an extreme example of very tight coupling, an input consisting of a small bright spot surrounded by a dark field could at the output plane appear as a grey spot in an irregularly illuminated field; i.e., the power could be coupled out of the initial waveguides and be distributed among the other waveguides in the array. The image degradation in such a situation is obvious. Therefore coupling between the waveguides must be kept to a minimum and therefore requires some spacing between the waveguides.

The physical parameters effecting coupling between the waveguides are fiber size (cross section), fiber spacing, refractive indicies of the cores 12 and cladding 11, and the core length. The significant waveguide length is not simply the physical thickness of the array, but rather the optical thickness, $L_0$, taking into account the multiple passes within the resonator. This is approximately given by equation 4:

$$L_0 = \frac{L_a \sqrt{R}}{1-R} \quad (4)$$

where $L_a$ is the actual physical thickness and $R$ is the reflectivity of the resonator mirrors. The physical thickness or distance between the mirrors is given by equation 5:

$$L_a = \frac{\lambda_g^2(1-R)}{2\pi \Delta\lambda \sqrt{R}} \quad (5)$$

where $\lambda_g$ is the guide wavelength, $\Delta\lambda$ is the desired bandwidth (see FIG. 3).

The design procedure to be followed in selecting the spacing and arrangement of the cores that comprise the array will be to determine some reasonable criteria based on image considerations for the maximum allowable coupling between cores. Then since the array length is predetermined by resonator considerations, the core spacing and refractive indicies of the cores 12 and cladding 11 are chosen to minimize fiber coupling and intercept loss.

The frequency characteristics of the waveguide array filter are identical, assuming negligible fiber coupling, to a single waveguide resonator. It can be shown that for such a resonator the transmitted intensity $I$ is related to the incident intensity $I_0$, by the general expression given in equation 6:

$$\frac{I}{I_0} = \frac{1}{1 + \frac{4R}{(1-R)^2} \sin^2\left(\frac{\delta}{2}\right)} \quad (6)$$

In the case of the waveguide type filter $\delta$ is given by equation 7:

$$\delta = \frac{4\pi}{\lambda_g} L_a \quad (7)$$

It should be noted that $\lambda_g$ is related to the angle at which the component plane wave for the dominant mode propagates and is independent of the angle of the incident wave. Equation 6 is applicable to conventional Fabry-Perot filters or the waveguide type described herein.

Any dissimilarities in shape, index of refraction, or length among the various fibers in the array will change the guide wavelength and produce a displacement in the center frequency for these fibers resulting in different transmission for different fibers and possible image distortion. Assuming that such variations are randomly distributed throughout the array, the major effect will be to broaden the passband of the composite filter, since the response of the array is the sum of the individual responses.

What is claimed is:

1. A wide angle optical filter, for transmitting only a desired portion of the frequency spectrum of an incident optical wave, comprising:

a plurality of laterally spaced optical waveguide means for providing single-mode transmission of said incident wave; each of said waveguide means being of substantially equal length and arranged in a parallel array with one end of each waveguide means lying in a first plane and the opposite end of each waveguide means lying in a second plane parallel to said first plane;

and a plurality of semitransparent reflecting means positioned along and substantially perpendicular to the longitudinal axis of each of said waveguide means including a first semitransparent mirror located adjacent and parallel to said first plane and a second semitransparent mirror located adjacent and parallel to said second plane for providing a filtering effect in each of said waveguide means for limiting the transmission of the incident wave in each of said waveguides to the desired portion of the frequency spectrum;

whereby the frequency response of said filter is substantially the same as the frequency response of each of said waveguide filters and is independent of the angle of the incident wave thereby providing an optical filter capable of providing narrow band transmission of an image over a wide field of view.

2. An optical filter as specified in claim 1 in which the plurality of semitransparent reflecting means includes a first semitransparent reflecting means positioned near one end of each of said waveguide means and a second semitransparent reflecting means positioned near the opposite end of each of said waveguide means, said first and second semitransparent reflecting means providing Fabry-Perot type filtering in each of said waveguides.

3. An optical filter as specified in claim 1 in which said plurality of optical waveguide means consists of a block of a first dielectric material and a plurality of parallel cores of a second dielectric material located within said block between a pair of opposite faces, with each of said cores and the first dielectric material surrounding it comprising an optical waveguide.

4. An optical filter as specified in claim 3 in which the plurality of semitransparent reflecting means consists of a pair of semitransparent mirrors vacuum deposited on said pair of opposite faces of said dielectric block.

5. An optical filter as specified in claim 1 in which the waveguides are multimode dielectric waveguides and which additionally includes means for substantially limiting the excitation of said waveguides to the dominant mode.

6. An optical filter as specified in claim 1, in which the waveguides are single mode dielectric waveguides.

7. An optical filter having a narrow bandwidth and a wide field of view, comprising:
- a block of dielectric material having a refractive index $n_2$;
- a plurality of dielectric cylindrical cores, having a refractive index $n_1$, which is higher than $n_2$, positioned within said block between a pair of opposite parallel faces, each of said cores having circular cross sections whose diameter ($d$) is equal to or less than
$$\frac{2.4\lambda}{\pi\sqrt{n_1^2 - n_2^2}}$$
where $\lambda$ is the free space wavelength of light;
- and a pair of semitransparent mirrors vacuum deposited on said pair of opposite faces of the dielectric block.

8. An optical filter as specified in claim 7 in which the distance ($L_n$) between said opposite faces is approximately
$$\frac{\lambda_g^2(1-R)}{2\pi\Delta\lambda\sqrt{R}}$$
where $\lambda_g$ is the guide wavelength, $\Delta\lambda$ is the desired bandwidth and $R$ is the reflectivity of the mirror.